D. WITTNEBERT.
ADDING AND SUBTRACTING MACHINE.
APPLICATION FILED SEPT. 21, 1918.
1,361,949.
Patented Dec. 14, 1920.
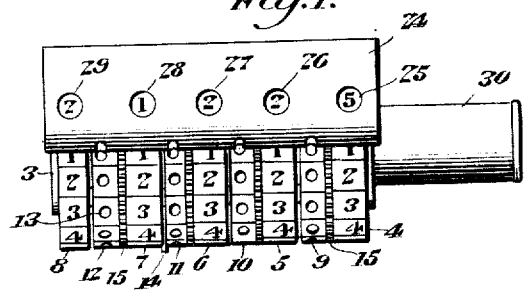
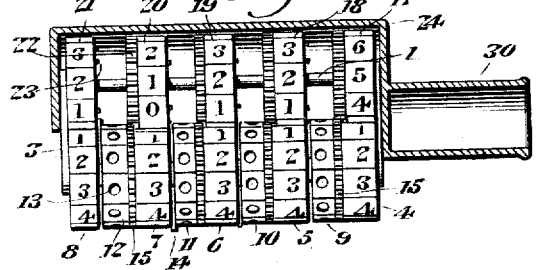
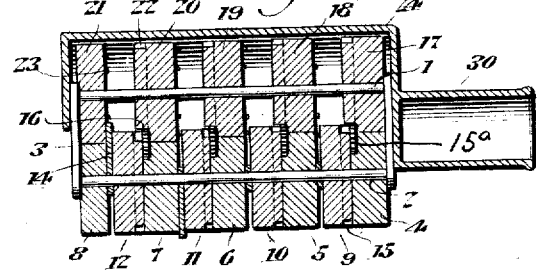
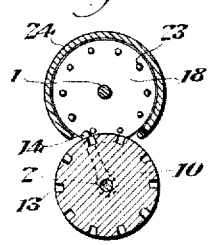
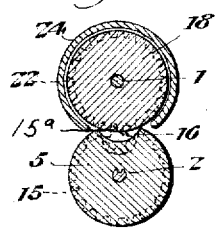
Inventor
Duke Wittnebert
By Victor J. Evans
Attorney
Witnesses

UNITED STATES PATENT OFFICE.

DUKE WITTNEBERT, OF DEL RIO, TEXAS.

ADDING AND SUBTRACTING MACHINE.

1,361,949.   Specification of Letters Patent.   Patented Dec. 14, 1920.

Application filed September 21, 1918. Serial No. 255,078.

*To all whom it may concern:*

Be it known that I, DUKE WITTNEBERT, a citizen of the United States, residing at Del Rio, in the county of Val Verde and State of Texas, have invented new and useful Improvements in Adding and Subtracting Machines, of which the following is a specification.

This invention is an improved adding machine which can be also used for subtracting, and which is especially adapted to be attached to one end of a lead pencil, the object of the invention being to provide a machine of this kind which is extremely light in weight, is small and compact, is easy to operate and convenient for any class of work in addition or subtraction, and which can be readily manufactured at small cost and is simple in construction.

With the above and other objects in view, the invention consists in the construction, combination and arrangement of devices hereinafter described and claimed.

In the accompanying drawings:—

Figure 1 is an elevation, on an enlarged scale, of an adding machine constructed and arranged in accordance with my invention.

Fig. 2 is a similar view of the same with the casing in section.

Fig. 3 is a longitudinal sectional view of the same.

Figs. 4 and 5 are transverse sectional views of the same.

In the embodiment of my invention, I provide a pair of shafts 1, 2 which are secured in spaced relation by braces 3 which are arranged at the ends of said shafts, the said shafts being fixed. A series of disks or guide wheels 4, 5, 6, 7 and 8 are fixed to the shaft 2 in spaced relation and respectively indicate units, tens, hundreds, thousands and tens of thousands and are each provided with peripherally arranged numbers from one to nine, as shown. Carrier wheels 9, 10, 11, 12 are arranged for rotation on the shaft 2 and between the disks or guide wheels 4, 5, 6, 7, 8, and each carrier wheel is provided with ten radial openings 13 for the reception of a pencil point or the like, to enable said wheels to be turned. Each carrier wheel is provided on one side with a radially projecting tappet 14 which is fixed thereto and turns therewith. Each carrier wheel is provided on the right hand side, which is the side opposite that on which the tappet 14 is arranged, with twenty spur gear teeth 15. In a recess 15ᵃ in the left hand side and periphery of each fixed disk or guide wheel is a small detent gear 16 which is adapted to rotate about its axis.

A series of registering wheels or disks 17, 18, 19, 20 and 21 are mounted on the shaft 1 for independent rotation and are arranged in line with the fixed guide wheels or disks and are each peripherally numbered from one to naught, the said registering wheels respectively indicating units, tens, hundreds, thousands and tens of thousands. On the left hand side of each of the registering wheels 17, 18, 19 and 20 is a gear of twenty spur teeth 22 which are respectively engaged by the gear or spur teeth of the carrier wheels 9, 10, 11 and 12, so that the carrier wheel 9 is geared to the units wheel 17, the carrier wheel 10 is geared to the tens wheel 18, the carrier wheel 11 is geared to the hundreds wheel 19, and the carrier wheel 12 is geared to the thousands wheel 20. Each of the wheels 18, 19, 20 and 21 is provided on the right hand side with a series of ten tappets 23 which are parallel and in concentric relation to the shaft 1 and correspond with the peripheral numbers on said wheels and are adapted to be engaged by the tappets 14 of the carrier wheels. The detent gears 16 in the fixed guide wheels or disks also engage the gears of the registering wheels. The function of these detent gears is to prevent too free or casual rotation of the registering wheels without interfering with the necessary step by step rotation of said wheels.

The registering wheels are covered by a substantially semi-cylindrical casing 24 which has openings 25, 26, 27, 28, 29 on one side through which respectively the peripheral numbers of the registering wheels may be displayed. At one end of the casing is a socket piece 30 for the reception of one end of a lead pencil or other suitable holder.

In practice, the machine is, preferably, very small so that it can be conveniently carried on a lead pencil and without interfering with the use of the lead pencil as such but within the scope of the invention the machine may be made of any suitable size and may be made of any suitable material. Preferably, also, to minimize the weight, the various wheels or disks may be hollow or spoked.

To add, the appropriate carrier wheels are turned in one direction and to subtract the carrier wheels are turned appropriately in the reverse direction. It will be understood that at each complete rotation of one of the carrier wheels the registering wheel to the right thereof and which is geared thereto will be correspondingly turned and the registering wheel to the left thereof will be turned through one-tenth of a revolution by the engagement of the tappet 14 with one of the tappets 23. Hence, the naught or ten will be carried from one column into the next higher column throughout the series, as will be understood.

While I have herein shown and described a preferred embodiment of my invention, I would have it understood that changes may be made in the forms, proportion and construction of the several parts without departing from the spirit of my invention and within the scope of the appended claim.

Having thus described my invention, I claim:

In an adding and subtracting machine, the combination of a casing having openings, registering wheels independently revoluble in said casing opposite said openings and having spur gears and also having lateral pins in circular series, fixed disks or guide wheels arranged in spaced relation and each in alinement with one of the registering wheels and each having in its periphery and one side a recess, gears arranged and adapted to rotate in said recess and intermeshed with the spur gears of the registering wheels, carrier wheels revoluble in the spaces between the fixed disks or guide wheels and having spur gears intermeshed with those of the registering wheels and also having peripheral sockets, and a tappet carried by each carrier wheel for coöperation with the pins of one registering wheel.

In testimony whereof I affix my signature.

DUKE WITTNEBERT.